Aug. 11, 1936.  C. B. MYHRE  2,050,367
AUTOMATIC CONTROL SYSTEM
Filed Dec. 1, 1934   2 Sheets-Sheet 2

WITNESSES:   INVENTOR
  Conrad B. Myhre.
  BY
  ATTORNEY

Patented Aug. 11, 1936

2,050,367

UNITED STATES PATENT OFFICE 2,050,367

AUTOMATIC CONTROL SYSTEM

Conrad B. Myhre, Harvey, N. Dak., assignor to Westinghouse Electric & Manufacturing Company, East Pittsburgh, Pa., a corporation of Pennsylvania Application December 1, 1934, Serial No. 755,647

8 Claims. (Cl. 183—7)

My invention relates, generally, to electrical control systems and it has particular relation to automatic control systems for operating electrical precipitators and the like.

The object of my invention, generally stated, is to provide an automatic control system for electrical precipitators which shall be simple and efficient in operation and which may be readily and economically manufactured and installed.

The principal object of my invention is to provide for automatically maintaining an electrical precipitator energized at the proper operating potential.

Another important object of my invention is to provide for automatically connecting an electrical precipitator to a power source.

A further object of my invention is to provide for connecting an additional power unit to an electrical precipitator when the pressure of the gas passing therethrough is increased beyond a predetermined value.

Another object of my invention is to provide for automatically disconnecting, in the event of a fault, a power unit from a power source and an electrical precipitator which it is arranged to maintain energized.

Still another object of my invention is to provide for selecting any of a plurality of power units, which are arranged to maintain an electrical precipitator in the operating condition, as the preferred unit.

Other objects of my invention will in part be obvious and in part appear hereinafter.

My invention accordingly is disclosed in the embodiment hereof shown in the accompanying drawings and comprises the features of construction, combination of elements and arrangement of parts which will be exemplified in the construction hereinafter set forth and the scope of the application of which will be indicated in the appended claims.

Figure 1:
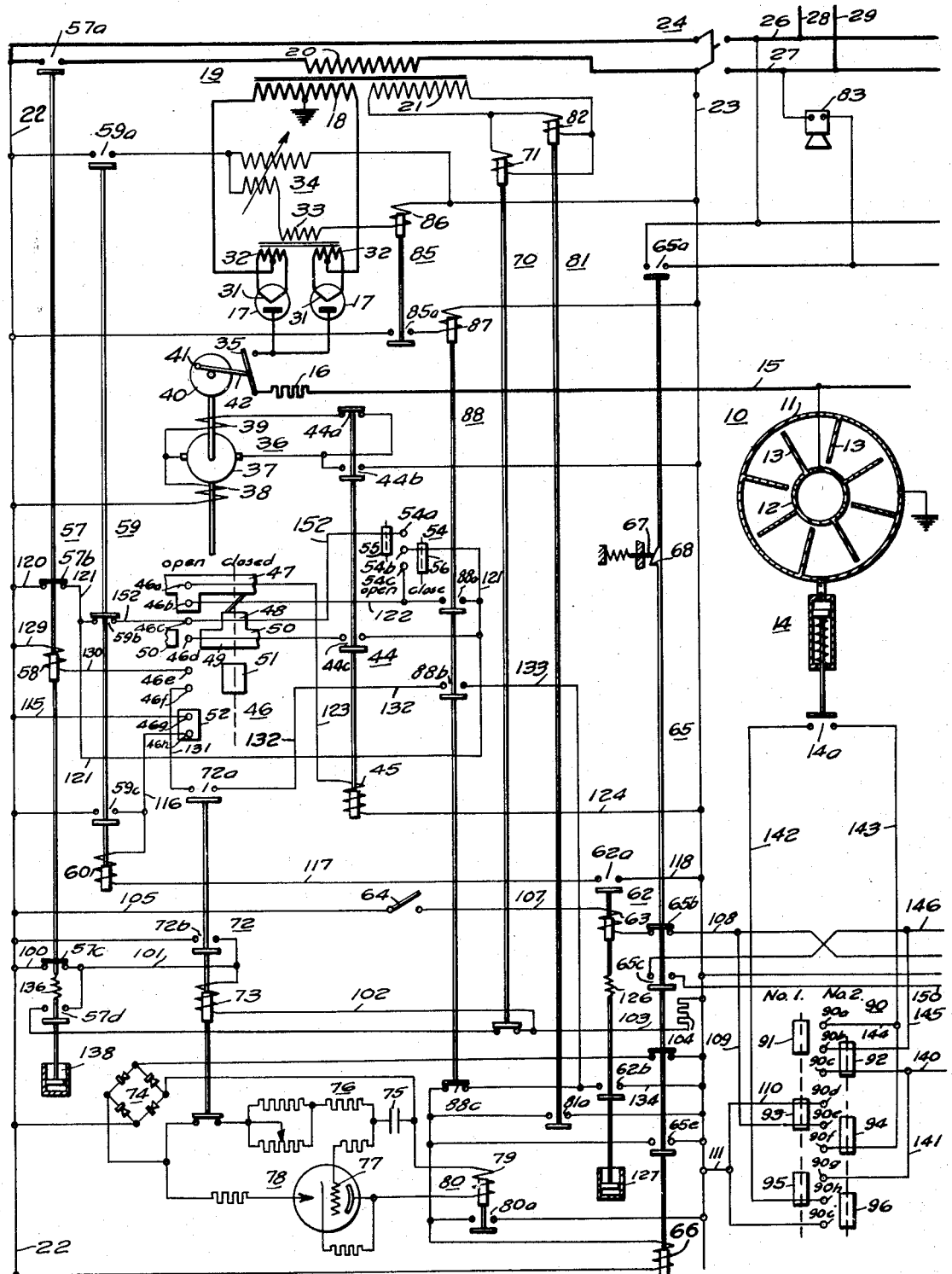
Figure 2:
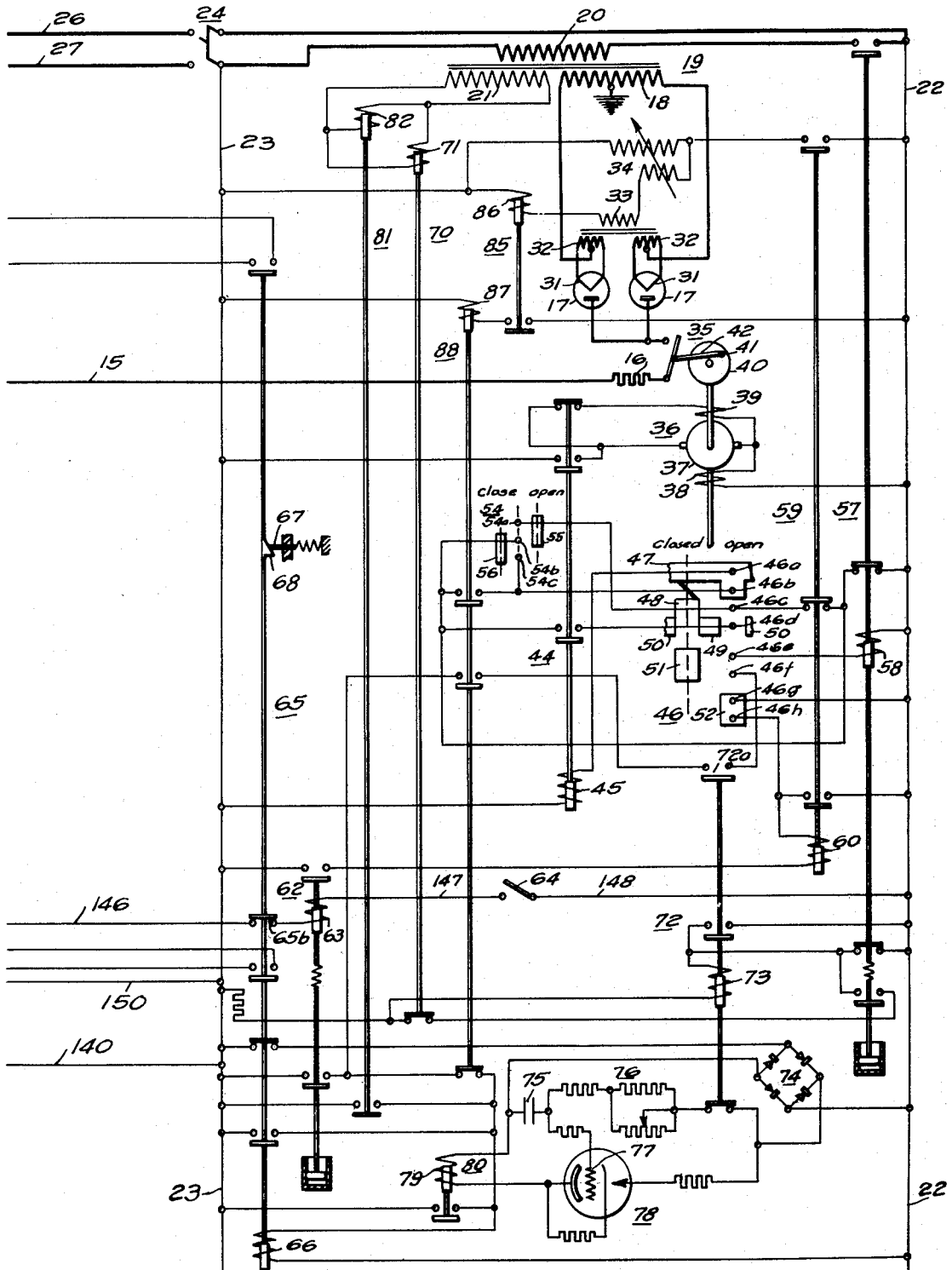

For a more complete understanding of the nature and scope of my invention, reference may be had to the following detailed description taken in connection with the accompanying drawings, in which Figure 1 illustrates diagrammatically a power unit connected to energize an electrical precipitator, and Fig. 2 illustrates diagrammatically a second power unit which may also be connected to energize the precipitator shown in Figure 1.

In a manufacturing process in which it is desired to purify a gas by means of an electrical precipitator, it is desirable to maintain the precipitator in the proper operating condition in order that the manufacturing process may be carried on with a minimum of delay and a maximum of efficiency. It is, therefore, desirable to provide for energizing the precipitator continuously and, in the event of the failure of one power source, to provide for connecting an auxiliary power source to maintain the precipitator in the energized condition.

For this purpose, according to my invention, I have provided two independent power units which are arranged to rectify, by means of suitable space discharge devices, high voltage alternating current and to apply the direct current potential thus obtained to an electrical precipitator. Normally, only one of the two power units is connected to energize the precipitator and a sequence switch is provided for determining which of the power units will normally be connected to the precipitator. In the event that a fault occurs in the power unit connected to energize the precipitator or in the event that the gas pressure within the precipitator increases beyond a predetermined value, the second unit will be automatically connected to also apply an energizing potential to the precipitator.

If a fault occurs in either of the power units while it is operating, an alarm will be given to the operator and the unit in which the fault occurred will be automatically locked out. It is then necessary for the operator to reset the unit before it can again be placed in service.

Referring now particularly to the drawings, it will be observed that the control system shown in Figure 2 is identical with that shown in Fig. 1, except for certain apparatus in Fig. 1 which is common to both systems. Insofar as the control systems are identical, the same reference characters have been applied to identical elements for the purposes of clarity and simplicity and to reduce the number of different reference characters to a minimum. The control system will be described with reference to Fig. 1 of the drawings and then the operation will be set forth to indicate the functioning of the portion of the control system illustrated in Fig. 2.

An electrical precipitator, shown generally at 10, is provided through which the gas to be purified may be passed. The precipitator 10 may be of any of the well known types and, since its construction forms no part of this invention, it has been shown only diagrammatically. As illustrated, the precipitator 10 may comprise an outer cylinder 11 and an inner cylinder 12, each being provided with spaced interfitting fins 13 for increasing the surface area thereof.

When the amount of gas passing through the precipitator 10 exceeds a predetermined value, it is necessary to increase the potential applied to the cylinders 11 and 12 in order to obtain the proper degree of purification. Since the pressure within the precipitator 10 is a function of the volume of the gas passing therethrough, a pressure responsive relay, shown generally at 14, is provided having contact members 14a for completing a circuit, which will be hereinafter described, to automatically cause the second power unit, as shown in Fig. 2 for example, to be connected to the precipitator 10 when the pressure within it exceeds the value for which the pressure responsive relay 14 is set.

As illustrated, the outer cylinder 11 of the precipitator 10 may be connected to ground while the inner cylinder 12 may be connected to a high voltage direct current bus or conductor 15 which is connected through a stabilizing resistor 16 to the anodes of a pair of space discharge devices 17. The space discharge devices 17 are connected to provide full-wave rectification for alternating current obtained from a high voltage secondary winding 18 of a transformer, shown generally at 19, the center tap of the secondary winding 18 being grounded. The transformer 19 is provided with a low voltage primary winding 20 and a tertiary winding 21. As illustrated, the primary winding 20 is arranged to be connected to conductors 22 and 23 which may be connected by means of a main switch 24 to a power bus comprising conductors 26 and 27. The conductors 26 and 27 may be connected to any suitable source of alternating current which may be represented by the conductors 28 and 29.

As shown, each of the space discharge devices 17 is provided with a cathode 31 each of which is connected to a secondary winding 32 of a cathode transformer, the common primary winding 33 of which is disposed to be connected through a regulating transformer 34 to the conductors 22 and 23.

In order to disconnect the high voltage direct current bus 15 from the anodes of the space discharge devices 17, a disconnecting switch, shown generally at 35, is provided which is disposed to be operated by means of a motor shown generally at 36. The motor 36 may be of the series type having an armature 37, a series field winding 38 and a braking field winding 39. The armature 37 is mechanically connected to the disconnecting switch 35 by means of a power transmitting mechanism that comprises a wheel 40 on which is eccentrically mounted a pin 41. A connecting rod 42 is provided for connecting the pin 41 to the disconnecting switch 35. It will be understood that the disconnecting switch 35 is operated to the closed position on energization of the motor 36. When the disconnecting switch 35 is closed, the motor 36 is deenergized. In order to open the disconnecting switch 35, the motor 36 is again energized to rotate in the same direction and, due to the construction of the power transmitting mechanism, the disconnecting switch 35 will be opened, as will be readily understood.

The operation of the motor 36 is controlled by means of a motor control switch, shown generally at 44, having an operating winding 45. The motor 36 is arranged to operate a motor limit switch, shown generally at 46. The motor limit switch 46 comprises contact fingers 46a through 46h and contact segments 47 through 52.

In the event that it is desired to manually control the operation of the motor 36, a manual control switch, shown generally at 54, is provided. The control switch 54 comprises contact fingers 54a, 54b, and 54c and contact bridging members 55 and 56.

In order to connect the primary winding 20 of the power transformer 19 to be energized, a power transformer switch, shown generally at 57, is provided having an operating winding 58. The circuit for effecting the energization of the primary winding 33 of the cathode transformer and thereby the cathodes 31 of the space discharge devices 17 may be completed by means of a cathode switch, shown generally at 59, and having an operating winding 60.

A master control relay, shown generally at 62, and having an operating winding 63 is provided for effecting the energization of the operating winding 60 of the cathode switch 59. The master control relay 62 is controlled by means of a knife switch 64.

In the event that a fault occurs in the operation of the system, it is desirable to automatically disconnect it from the power source and to prevent it from again being connected to the precipitator 10 until it has been inspected by the operator. For this purpose, a lockout relay shown generally at 65 and having an operating winding 66 is provided to effect various control functions which will be set forth hereinafter. The operating winding 66 of the lockout relay 65 is disposed to be energized on the occurrence of one or more of several different faults which may happen during the operation of the system. When the lockout relay 65 has once been energized, a spring-pressed pawl 67 is arranged to engage a projection 68 and thereby to hold the lockout relay 65 in the energized or closed position until the pawl 67 is manually released.

It is desirable to disconnect the system from the power source in the event that the voltage applied to the precipitator 10 should decrease below a predetermined value. Such may be the case in the event that the precipitator 10 becomes short circuited, as may occur if the deposit on the surfaces of the cylinders 11 and 12 and the fins 13 is allowed to accumulate, or if a large volume of conducting atmosphere is caused to pass through the precipitator 10. An undervoltage relay, shown generally at 70, and having an operating winding 71 connected across the tertiary winding 21 is provided to effect the deenergization of an undervoltage auxiliary relay, shown generally at 72, and having an operating winding 73 in the event that the voltage supplied by the transformer 19 becomes lower than a predetermined value to effect the deenergization of the operating winding 58 and thereby to disconnect the primary winding 20 from the power circuit.

It will be understood that the undervoltage auxiliary relay 72 is normally disposed to be in the operated position. However, in the event that it is deenergized due to the operation of the undervoltage relay 70, a circuit is completed at contact members 72c for connecting a rectifier 74, which may be of the copper oxide type, to apply a charge to a capacitor 75 through a network of resistors shown generally at 76. In the event that several short circuits occur in rapid succession, the capacitor 75 will ultimately be charged to a comparatively high value so that a grid 77 in a space discharge device 78 will then have applied thereto a sufficiently high energizing potential as to cause the space discharge device 78 to become conducting. On becoming conducting, the space discharge device 78 is effective to complete a circuit for energizing a winding 79 of a relay shown generally at 80, which is disposed to effect the energization of the operating winding 66 of the lockout relay 65.

It is also desirable to disconnect the unit from the power source in the event that the voltage applied to the precipitator exceeds a predetermined voltage. Such operation is desirable in order to prevent a breakdown of the insulation due to the application of an excessively high voltage. For this purpose, an overvoltage relay, shown generally at 81, and having an operating winding 82 connected across the tertiary winding 21 is provided. This relay when energized with a predetermined overvoltage will complete a circuit for effecting the energization of the operating winding 66 of the lockout relay 65.

In order to give an audible signal to the operator that the lockout relay 65 has been operated, a signal device 83, such as a horn, bell or the like, may be provided. The signal device 83 will continue to give the signal to the operator until the lockout relay 65 is returned to the de-energized condition.

In order to disconnect the power unit from the power source in the event that current to the cathodes 31 of the space discharge devices 17 fails and also to provide for a proper sequence of operation, a current responsive relay shown generally at 85 is provided having an operating winding 86 connected in series circuit relation with the primary winding 33 of the cathode transformer. The current responsive relay 85 is arranged to effect the energization of an operating winding 87 of an auxiliary relay, shown generally at 88.

With a view to maintaining continuity of operation of the entire system, the second power unit shown in Fig. 2 is provided. In the operation of the system, it is, of course, desirable to have one or the other of the two power units preferred so that, when the precipitator 10 is operating at light loads or below a predetermined pressure, only one of the power units will be connected thereto. However, on the precipitator 10 being loaded beyond a predetermined amount, as indicated by the pressure of the gas therein, it is desirable to have the second unit automatically connected to maintain the potential between the cylinders 11 and 12 of the precipitator 10 at the proper operating value. With this function in view, a transfer or sequence switch, shown generally at 90, is provided having contact fingers 90a through 90i, certain of which are arranged to be bridged by contact bridging members 91 through 96. When none of the contact fingers are bridged neither of the units may be automatically operated. When the sequence switch 90 is operated to the position indicated as No. 1, the power unit illustrated in Fig. 1 of the drawings will be the preferred unit and will be automatically connected to energize the precipitator 10. In the event of a failure of this unit or the pressure in the precipitator 10 exceeding a predetermined value, the power unit shown in Fig. 2 will be automatically connected to supply the necessary operating potential to the precipitator 10.

When the sequence switch 90 is operated to the position indicated as No. 2, the power unit illustrated in Fig. 2 of the drawings will be the preferred unit and will be automatically connected to energize the precipitator 10. On the occurrence of a fault in this unit or if the pressure within the precipitator 10 exceeds a predetermined value, the power unit illustrated in Fig. 1 of the drawings will be automatically connected to the precipitator 10.

In describing the operation of the automatic control system, it will be assumed that the conductors 28 and 29 are energized with a suitable alternating current potential, that the main switches 24 and knife switches 64 are closed, that the sequence switch 90 is in the No. 1 position and that all of the remaining apparatus is in the position shown in the drawings. The power unit illustrated in Fig. 1 of the drawings will then be automatically operated to energize the precipitator 10, as will be set forth in detail as follows.

The application of energizing potential to the conductors 22 and 23 on closure of the main switch 24 applies an energizing potential to the operating winding 73 of the undervoltage auxiliary relay 72, so that it will immediately be energized.

The circuit for energizing the operating winding 73 may be traced from the energized conductor 22 through conductor 100, contact members 57c, conductor 101, operating winding 73, conductors 102 and 103 and resistor 104 to the energized conductor 23. At contact members 72b, the undervoltage auxiliary relay 72 completes a circuit for holding itself in even though contact members 57c are opened on a subsequent operation of the power transformer switch 57.

The closure of the knife switch 64 completes a circuit for energizing the operating winding 63 of the master control relay 62 which extends from the energized conductor 22 through conductor 105, knife switch 64, conductor 107, operating winding 63, contact members 65b of the lockout relay 65, conductors 108 and 109, contact members 90c and 90d which are bridged by contact member 93 and conductors 110 and 111 to the energized conductor 23.

The operation of master control relay 62 completes a circuit for energizing the operating winding 60 of the cathode switch 59 which, at its contact members 59a, completes the energizing circuit for the regulating transformer 34 and the primary winding 33 of the cathode transformer.

The circuit for energizing operating winding 60 may be traced from the energized conductor 22 through conductor 115, contact fingers 46g and 46h which are bridged by contact segment 52, conductor 116, operating winding 60, conductor 117, contact members 62a of the master control relay 62 and conductor 118 to the energized conductor 23. The cathode switch 59 at contact members 59c completes a circuit for maintaining the operating winding 60 energized when the contact segment 52 is moved out of engagement with the contact fingers 46g and 46h.

No further operation can take place until current flow is established in the primary winding 33 of the cathode transformer. The operating winding 86 of the current responsive relay 85 will then be energized and at contact members 85a an obvious energizing circuit will be completed for the operating winding 87 of the auxiliary relay 88. The operation of the auxiliary relay 88 will complete, at contact members 88a, a circuit for energizing the operating winding 45 of the motor control switch 44. Its operation will also open the contact members 88c, thereby opening a possible energizing circuit for the operating winding 66 of the lockout relay 65.

The circuit for energizing the operating winding 45 may be traced from the energized conductor 22 through conductor 120, contact members 57b of the power transformer switch 57, conductor 121, contact members 88a, conductor 122, contact fingers 46b and 46a bridged by the contact segment 47, conductor 123, operating winding 45 and conductor 124 to the energized conductor 23.

At contact members 44a, the braking circuit of the motor 36 will be opened and at contact members 44b an obvious energizing circuit will be completed for the motor 36.

When the motor 36 is energized, the wheel 40 will be rotated to move the pin 41 and thereby the connecting rod 42 to close the disconnecting switch 35. At the same time, motor limit switch 46 is also operated to remove the contact segment 47 from engagement with the contact finger 46b. However, during the transition period, the circuit for energizing the operating winding 45 of the motor control switch 44 is maintained by means of the contact segment 49 which engages the contact 46d and through contact members 44c completes an obvious energizing circuit for the operating winding 45. When the disconnecting switch 35 is in the closed position, the motor limit switch 46 will also be in the indicated closed position and the energizing circuit for the operating winding 45 of the motor control switch 44 will be opened and consequently the operating winding 45 will be deenergized.

In the closed position, the motor limit switch 46 will complete a circuit for effecting the energization of the operating winding 58 of the power transformer switch 57. This circuit, however, has been prevented from being completed previously by means of contact members 62b on the master control relay 62. It will be observed that contact members 62b are connected to the main operating stem of the master control relay 62 through a spring 126 and that a dashpot 127 is provided for preventing the closure of the contact members 62b simultaneously with the operation of the master control relay 62. The time delay provided by the dashpot 127 prevents the closure of the power transformer switch 57 to apply ionizing potential to the anodes and cathodes of the space discharge devices 17 until the cathodes 31 have become heated to the proper operating temperature.

The circuit for energizing the operating winding 58 may be traced from the energized conductor 22 through conductor 129, operating winding 58, conductor 130, contact fingers 46e and 46f bridged by the contact segment 51, conductor 131, contact members 72a, conductor 132, contact members 88b, conductor 133, contact members 62b and conductor 134 to the energized conductor 23.

The operation of the power transformer switch 57 completes, at contact members 57a, an obvious energizing circuit for the primary winding 20 of the power transformer 19. In addition, contact members 57b are opened, thereby preventing the energization of the operating winding 45 of the motor control switch 44 and the subsequent operation of the motor 36 to open the disconnecting switch 35 as long as the power transformer switch 57 remains in the operated position.

It will also be observed that contact members 57d will be closed a certain time after the operation of the power transformer switch 57 to complete a circuit for shunting the operating winding 73 of the undervoltage auxiliary relay 72 when this circuit is completed by the deenergization of the operating winding 71 of the undervoltage relay 70. This time delay may be accomplished in the manner described hereinbefore by means of a spring 136 interposed between the contact members 57d and the main stem of the power transformer switch 57, together with a dashpot 138. The direct current operating potential will now be applied to the high voltage direct current bus 15 and across the cylinders 12 and 11 of the precipitator 10.

In the event that the pressure within the precipitator 10 exceeds a predetermined value during normal operation, the contact members 14a of the pressure responsive relay 14 will be closed to complete a circuit for initiating the automatic functioning of the second power unit shown in Fig. 2 of the drawings. On the closure of contact members 14a, the operating winding 63, of the master control relay 62 of the unit shown in Fig. 2, will be energized to initiate a sequence of operation in this unit which is identical to that described hereinbefore in connection with the operation of the power unit illustrated in Fig. 1 of the drawings. For this reason only the circuit for effecting the energization of operating winding 63 will be traced.

The circuit for energizing the operating winding 63 for the unit shown in Fig. 2 may be traced from the energized conductor 23 of this figure through conductors 140 and 141, contact members 90g and 90h which are bridged by the contact member 95, conductor 142, contact members 14a, conductors 143 and 144, contact fingers 90a and 90b bridged by contact member 91, conductors 145 and 146, contact members 65b, operating winding 63, conductor 147, knife switch 64 and conductor 148 to the energized conductor 22.

In the event that the pressure within the precipitator 10 decreases below a value sufficient to maintain the contact members 14a closed, the previously traced energizing circuit for the operating winding 63 will be opened and the second unit will be automatically disconnected from the power source. The sequence of operations for disconnecting the unit under these circumstances will be the same as for disconnecting the unit shown in Fig. 1, which sequence of operation will be set forth in detail hereinafter.

If the voltage applied by the tertiary winding 21 to the operating winding 71 of the undervoltage relay 70 decreases below a predetermined value, the operating winding 73 of the undervoltage auxiliary relay 72 will be shunted and the energizing circuit for the operating winding 58 of the power transformer switch 57 will be opened at contact member 72a. As a result of the deenergization of the operating winding 58, contact members 57d will be opened to open the shunting circuit around the operating winding 73. Contact members 57a will be opened and the primary winding 20 will be deenergized. Contact members 57c will be closed and operating winding 73 will again be energized over the circuit described hereinbefore. Contact members 72a will be again bridged and the operating winding 58 of the power transformer switch 57 will be energized to again effect the energization of the primary winding 20.

Referring again to Fig. 1 of the drawings, it will be remembered that the lockout relay 65 may be operated to open, at contact members 65b, the energizing circuit for the operating winding 63 of the master control relay 62 on the occurrence of one or more different faults in the system.

On the occurrence of any of the faults for which provision has been made, the lockout relay 65 will be operated and will complete a circuit for initiating the automatic functioning of the other unit.

Thus, if the operating winding 71 of the undervoltage relay 70 is deenergized for a sufficient number of times to cause the operating winding 73 of the undervoltage auxiliary relay 72 to be deenergized thereby charging the capacitor 75 to such a value that the space discharge device 78 is rendered conducting, then the operating winding 79 of the relay 80 will be energized to complete at contact members 80a, an obvious energizing circuit for the operating winding 66 of the lockout relay 65.

In the event that the voltage applied to the system becomes excessive, as determined by the overvoltage relay 81, its contact members 81a will be closed to also complete an obvious energizing circuit for the operating winding 66 of the lockout relay 65.

If, for some reason, current ceases to flow to the primary winding 33 of the cathode transformer, the operating winding 86 of the current responsive relay 85 will be deenergized. The operating winding 87 of the auxiliary relay 88 will then become deenergized and contact members 88c will be closed. Due to the fact that contact members 62b of the master control relay 62 are closed, an obvious energizing circuit will be completed for the operating winding 66 of the lockout relay 65.

Assuming that one or more of the foregoing faults has occurred and that the operating winding 66 of the lockout relay 65 has been energized, a circuit will be completed thereby at contact members 65c for effecting the energization of the operating winding 63 of the master control relay 62 of the second unit.

This circuit may be traced from the energized conductor 23 of the second unit through conductor 150, contact members 65c, conductor 146, contact members 65b, operating winding 63, conductor 147, switch 64 and conductor 148 to the energized conductor 22. The second unit will then be automatically placed in operation as set forth hereinbefore.

The energization of operating winding 66 and the subsequent operation of the lockout relay 65 opens, at contact members 65b, the circuit for energizing the operating winding 63 of the master control relay 62. At the same time the lockout relay 65 is held in the operated position by means of the pawl 67 and also the operating winding 66 is connected directly to the energized conductor 23 by means of the contact members 65e. Before the lockout relay 65 can be restored to the normal position, it is necessary that the main switch 24 be opened to deenergize the conductors 22 and 23, thereby permitting the operating winding 66 to be deenergized. It is also necessary for the operator to depress the pawl 67 to remove it from engagement with the underside of the projection 68, as will be readily understood.

As soon as the operating winding 63 of the master control relay 62 is deenergized, the energizing circuit for the operating winding 60 of the cathode switch 59 is deenergized and the cathodes 31 of the space discharge devices 17 are deenergized.

When the master control relay 62 is operated to the open position, contact members 62b are also opened to open the energizing circuit for the operating winding 58 of the power transformer switch 57. This switch is then opened to disconnect the primary winding 20 of the transformer 19 from the energizing circuit.

On the cessation of flow of current through the primary winding 33 of the cathode transformer, the operating winding 86 of the current responsive relay 85 is deenergized and at contact members 85a, the energizing circuit for the operating winding 87 of the auxiliary 88 is opened. The operation of the auxiliary relay 88 opens, at contact members 88b, the energizing circuit for the primary winding 58 for the power transformer switch 57.

When the operating windings 58 and 60 of the switches 57 and 59, respectively, are deenergized a circuit is completed for again energizing the operating winding 45 of the motor control switch 44, thereby again effecting energization of the motor 36 to operate the disconnecting switch 35 to the open position.

The circuit for energizing the operating winding 45 of the motor control switch 44 may be traced from the energized conductor 22 through conductor 120, contact members 57b, conductor 121, contact members 54a and 54b bridged by segment 55, conductor 152, contact finger 46c, contact segments 48 and 47, conductor 123, operating winding 45 and conductor 124 to the energized conductor 23.

The circuit just traced for energizing the operating winding 45 will be maintained by means of the contact segment 50 during the transition period from the closed position of the disconnecting switch 35 to the open position thereof. This circuit will be completed through contact members 44c as set forth hereinbefore. When the motor 36 has operated the disconnecting switch 35 to the full open position, the energizing circuit for the operating winding 45 will be opened at contact segment 50 and the motor control switch 44 will be in the non-operated position. In this position the motor control switch 44 completes at contact members 44a, a dynamic braking circuit for the motor 36, so that it will be stopped substantially instantaneously as soon as power is removed therefrom.

When the lockout relay 65 is operated, an obvious energizing circuit is completed by its contact members 65a to connect the sound device 83 to the energized conductors 26 and 27. It will be understood that this device will continue in operation until the lockout relay 65 has been released by the operation of the pawl 67 and the opening of the main switch 24.

In the event that the preferred unit is locked out of operation and the second unit is automatically connected to energize the precipitator 10, it is desirable that the operator move the sequence switch 90 to the No. 2 position, so that the second power unit will be the preferred unit. The operator then may reset the lockout relay 65 of the first unit, and it will then be ready for a subsequent automatic operation in the event that a fault occurs in the second unit or the pressure in the precipitator 10 exceeds the predetermined value.

In the event that the power unit shown in Fig. 2 is connected by the sequence switch 90 to be the preferred unit, it will be understood that the power unit shown in Fig. 1 of the drawings will be automatically connected to the precipitator 10 in the manner described hereinbefore. Since this operation will be identical with that described hereinbefore when the sequence switch 90 is in the No. 1 position, it has been deemed unnecessary to set forth a detailed description of the sequence of operation.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. A power system for applying energizing potential to an electrical precipitator comprising, in combination, a source of alternating current, a transformer having a low voltage primary winding and a high voltage secondary winding, a pair of space discharge devices each having an anode and a cathode, the cathodes being connected to the secondary winding for the application of ionizing potential, a disconnecting switch for connecting the anodes to the precipitator, a motor for operating said disconnecting switch, a cathode switch for connecting the cathodes to said source of alternating current for heating them to operating potential, a power switch for connecting the primary winding of said transformer to said source of alternating current, and a lock-out relay disposed to be energized on the occurrence of a fault in the system for automatically effecting the opening of said disconnecting switch, cathode switch and power switch.

2. A power system for applying energizing potential to an electrical precipitator comprising, in combination, a source of alternating current, a transformer having a low voltage primary winding and a high voltage secondary winding, a pair of space discharge devices each having an anode and a cathode, the cathodes being connected to the secondary winding for the application of ionizing potential, a cathode switch for connecting the cathodes to said source of alternating current for heating them to operating potential, a disconnecting switch for connecting the anodes to the precipitator, a motor for operating said disconnecting switch, relay means responsive to the flow of cathode heating current for connecting said motor for energization to said source of alternating current, a power switch for connecting the primary winding of said transformer to said source of alternating current, an operating winding for said power switch, circuit means operative on closure of said disconnecting switch for connecting said operating winding for energization to said source of alternating current, and a lock-out relay disposed to be energized on the occurrence of a fault in the system for automatically effecting the opening of said cathode switch, disconnecting switch and power switch.

3. A power system for applying an energizing potential to an electrical precipitator comprising, in combination, a source of alternating current, a plurality of rectifying units for converting the alternating current into direct current for energizing the precipitator, relay means for sequentially initiating the functioning of said units, and manually-operable switch means disposed to determine the sequence in which the functioning of said units is initiated.

4. A power system for applying an energizing potential to an electrical precipitator comprising, in combination, a source of alternating current, a plurality of rectifying units for converting the alternating current into direct current for energizing the precipitator, means operable to select one of said units as the preferred unit, means for initiating the functioning of another of said units on the occurrence of a fault in the preferred unit.

5. A power system for applying an energizing potential to an electrical precipitator comprising, in combination, a source of alternating current, a plurality of rectifying units for converting the alternating current into direct current for energizing the precipitator, means operable to select one of said units as the preferred unit, and means responsive to a predetermined load on the precipitator for initiating the functioning of another of said units to operate in parallel with the preferred unit.

6. A power system for applying an energizing potential to an electrical precipitator comprising, in combination, a source of alternating current, a plurality of rectifying units for converting the alternating current into direct current for energizing the precipitator, means for preferring the operation of one of said units, means responsive to a predetermined load on the precipitator for initiating the functioning of another of said units to operate in parallel with the preferred unit, and means responsive to the reduction of the load on the precipitator below said predetermined load for discontinuing the operation of said additional unit.

7. A power system for applying an energizing potential to an electrical precipitator comprising, in combination, a source of alternating current, a plurality of rectifying units for converting the alternating current into direct current for energizing the precipitator, means for automatically initiating the functioning of one of said units to energize the precipitator, pressure means disposed to be responsive to the pressure within the precipitator, and means responsive to the operation of said pressure means for automatically initiating the functioning of another of said units when the pressure within the precipitator exceeds a predetermined value.

8. A power system for applying an energizing potential to an electrical precipitator comprising, in combination, a source of alternating current, a plurality of rectifying units for converting the alternating current into direct current for energizing the precipitator, means for preferring the operation of one of said units, means for automatically initiating the functioning of the preferred unit to energize the precipitator, pressure means disposed to be responsive to the pressure within the precipitator, means operable by said pressure means for automatically initiating the functioning of another of said units when the pressure within the precipitator exceeds a predetermined value, and means responsive to the occurrence of a fault in said preferred unit for automatically discontinuing the operation thereof and for automatically initiating the functioning of said other unit.

CONRAD B. MYHRE.